United States Patent Office 2,766,167
Patented Oct. 9, 1956

2,766,167

THIOXANETHIOL S(O,O-DIETHYL PHOSPHORODITHIOATE) AND PESTICIDES CONTAINING THE SAME

Albert H. Haubein, Christiana, Del., assignor to Hercules Powder Company, Wilmington, Del., a corporation of Delaware No Drawing. Application August 30, 1955, Serial No. 531,599

17 Claims. (Cl. 167—33)

This invention relates to new and useful organic dithiophosphate compounds and to pesticidal compositions containing the same.

The novel organic dithiophosphate compounds of this invention have the general formula

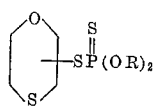

in which each R represents a lower alkyl radical.

These organic dithiophosphate compounds have pesticidal properties and distinguish themselves in being highly toxic at low concentrations toward certain pests.

The organic dithiophosphate compounds of this invention are made by reacting a monochlorothioxane with a diester of dithiophosphoric acid. The diester of dithiophosphoric acid may be reacted directly with the chlorothioxane or it may be reacted in the form of its salt or in the presence of materials which sequester the hydrogen chloride set free in the reaction.

The methods of making the products of this invention and methods of using the products as pesticides are more particularly described in the following examples in which all parts and percentages are by weight.

Example 1

A solution of 52 parts thioxane in 240 parts carbon tetrachloride solution was chlorinated with 35 parts chlorine gas at 0° to —10° C. A precipitate, formed initially by the reaction with chlorine, dissolved as the reaction progressed by gradual elevation of the temperature to 0° C. and hydrogen chloride was evolved. The hydrogen chloride was driven out of the mixture by a nitrogen sparge at 0° C. The resulting solution was a mixture of thioxane and 3-chlorothioxane in the ratio of about 3 to 2. This solution was added to a solution of 96 parts diethyl dithiophosphoric acid and 36 parts pyridine in about 200 parts toluene at room temperature, and the temperature was gradually raised over a two-hour period to about 110° C. where it was heated under a reflux for two hours. During this time pyridine hydrochloride crystallized out. The reaction mixture was worked up by washing with water, 10% aqueous sodium hydroxide solution, and then with water. After drying with anhydrous sodium sulfate, the product was recovered by removing low boiling materials by heating at 80° C. under a reduced pressure of 0.5 mm. The residue consisting of 3-thioxanethiol S(O,O-diethyl phosphorodithioate) amounted to 80 parts and was characterized by its analysis: 33.8% S, 11.2% P, and 0.3% Cl.

An emulsifiable concentrate of the 3-thioxanethiol S(O,O-diethyl phosphorodithioate) was made by mixing 1 gram of the residue with 1 ml. benzene and 1 ml. sorbitan monolaurate polyoxyalkylene derivative (Tween 20). This concentrate was then diluted with water to form dispersions of the residue in water varying in concentration from 1.0% to 0.025%. The dispersions were then tested for their toxicity to caged insects and to mites not only by spraying the insects but by spraying the plants alone as well for the purpose of determining residual toxicity. Standard test methods were used for obtaining the results set forth below.

When pea aphids were sprayed with a 0.025% emulsion of the composition of this example and placed on pea seedlings sprayed simultaneously with the same emulsion, there resulted 100% mortality in 48 hours.

Activity tests were also run by spraying lima bean seedlings infested with two-spotted mites to run off with 0.005% aqueous emulsion. There resulted 100% mortality to the mites after five days.

A 0.1% emulsion gave a 100% kill of caged flies and a 0.025% emulsion gave a 100% kill of Mexican bean beetles on lima bean seedlings.

Example 2

A solution of thioxane and 3-chlorothioxane was prepared as in Example 1. This solution was heated at about 78° C. for about two hours while sparging gently with nitrogen to drive off hydrogen chloride and was then distilled. The fraction boiling at 49° to 51° C. (21 mm.) was a mixture of thioxene and thioxane containing small amounts of chlorothioxane. Analysis showed 1.8% Cl and 29.9% S.

To 10 parts of this mixture of thioxane and thioxene in 40 parts benzene was added 0.3 part triethylamine and 19 parts diethyl dithiophosphoric acid. The resulting solution was heated at 80° C. for 8 hours and was then washed with water, with aqueous 10% sodium hydroxide solution and with fresh water. The dithiophosphoric ester amounting to 7 parts was recovered by distilling off the solvent and low boiling impurities at temperatures up to 60° C. at 0.5 mm. It analyzed 32.2% S and 11.3% P and was shown by infrared analysis to be a different thioxanediol S(O,O-diethylphosphorodithioate) from that obtained by direct reaction of 3-chlorothioxane with diethyl dithiophosphoric acid in the presence of pyridine as described in Example 1.

An emulsifiable concentrate was made up as in Example 1 and the concentrate was diluted to form dispersions in water of various concentrations. In comparison with the product of Example 1, a 0.05% concentration gave a 100% kill of two-spotted mites and a 0.1% concentration gave a 90% kill of pea aphids.

Example 3

A solution of thioxane and 3-chlorothioxane was prepared as in Example 1. This solution was heated under pressure at 100° for two hours and then gaseous hydrogen chloride was introduced as the solution was cooled to 25° C. The resulting solution was a mixture of thioxane and 2-chlorothioxane. This solution was added to a solution of 96 parts diethyl dithiophosphoric acid and 36 parts pyridine in about 200 parts toluene at room temperature. The temperature was then gradually raised over a two-hour period to about 110° C. where it was heated under reflux for 2 hours. The pyridine hydrochloride which formed in the reaction was washed out with water. The product was then further purified by washing with 10% aqueous sodium hydroxide and then with water. After drying over an anhydrous sodium sulfate, the solvent was removed under reduced pressure at temperatures up to 80° C. at 0.5 mm. The residue consisting of 2-thioxanethiol S(O,O-diethyl phosphorodithioate) amounted to 82 parts and was shown by analyses and infrared to be substantially the same as the 2-thioxanethiol S(O,O-diethyl phosphorodithioate) prepared following the procedure of Example 2 but different from the isomer produced in Example 1. It likewise was essentially equivalent in toxicity to insects to the product of Example 2.

Products related to the ethyl esters of Examples 1 and 2 by varying the alkyl group from methyl through butyl were prepared from the corresponding dialkyl dithiophosphoric acids in which alkyl groups were methyl, isopropyl, and isobutyl by the reactions of Examples 1 and 2. The methyl esters were as good as ethyl esters in insecticidal screening tests. The isopropyl esters were slightly inferior to the ethyl esters but superior to the isobutyl esters.

The organic dithiophosphate compounds of the formula

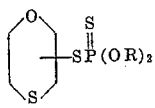

are those in which each R is the same or a different lower alkyl radical such as methyl, ethyl, n-propyl, isopropyl, n-butyl, sec-butyl or isobutyl. The preferred compounds are those containing lower alkyl radicals having 1–4 carbon atoms. The radicals which are especially effective are those with 1–3 carbon atoms in the radical.

In producing the compounds of this invention, the reaction between the chlorothioxane and the ester of dithiophosphoric acid or its salt is carried out by heating the two reactants at a temperature at which reaction takes place but below the decomposition temperature in the range of 20° to 200° C., preferably in the range of 30° to 110° C. The reactants may be mixed in any desired order. In order to get complete reaction, it is preferable to use an excess over the theoretical amount of the ester of the dithiophosphoric acid. When the reaction is complete, the excess ester of the dithiophosphoric acid is readily removed by washing with water containing sufficient alkali to produce the water-soluble salt.

The reaction of the dialkyl dithiophosphoric acid with 2-chlorothioxane gives a 2-thiol ester and the reaction of the dialkyl dithiophosphoric acid with 3-chlorothioxane gives a 3-thiol ester. While thioxene, which gives the 2-thiol ester, is formed under the conditions of reaction of the 3-chlorothioxane with the dialkyl dithiophosphoric acid, there is a sufficient difference in reaction rates that the isomer present in greatest amount is that which would be expected from the chlorothioxane isomer used in the reaction. When thioxene is produced first as in Example 2, the product is substantially all the 2-thiol isomer.

The reaction of the chlorothioxane with the dialkyl dithiophosphoric acid is preferably carried out in non-aqueous media. Organic solvents are desirable to aid in control of the reaction. Suitable solvents include benzene, toluene, xylene, cyclohexane, hexane, anhydrous alcohol solvents and dioxane. It is preferable to use hydrocarbon solvents when using an amine salt of the dithiophosphoric acid ester or when using an amine or ammonia as a sequestering reagent. After the reaction is complete, the solvent is readily removed by distillation.

When the diester of dithiophosphoric acid is used as the free acid in the reaction with the chlorothioxane, hydrogen chloride which is liberated is preferably sequestered by adding a material to combine with the hydrogen chloride as formed. It is convenient to use pyridine for this purpose. However, in its place, other tertiary organic amines may be used, and they may be added in equivalent amount at the beginning of the reaction or gradually during the course of the reaction. Likewise, the amine can be reacted with the diester of the dithiophosphoric acid prior to carrying out the reaction with the chlorothioxane as in Example 1. Amines which can be used include pyridine, tertiary alkylamines such as trimethylamine, tributylamine, triamylamine, dimethylaniline, and the like. Inorganic bases may also be used. These include ammonia, alkali metal hydroxides, carbonates and bicarbonates, and alkaline earth metal hydroxides and carbonates.

As in the case of organic bases, the inorganic bases may also be used first to form a salt of the ester of the dithiophosphoric acid. When the salt of the ester of dithiophosphoric acid is used as the reactant, it is preferable to use a salt which is soluble in the organic solvent used for the reaction. The organic salts of amines are particularly satisfactory because of the good solubility of these salts in the nonreactive hydrocarbon solvents. When the free acid is reacted with the chlorothioxane, the alkaline material is preferably added gradually as needed but it can be added all at once if desired. Ammonia is suitably added gradually as a gas, the solids are suitably added in finely divided form.

The dithiophosphoric acid ester is produced by reacting the lower aliphatic alcohol, which is to form a part of the ester, with $P_2S_5$, preferably in a nonreactive solvent such as benzene, toluene, xylene, hexane or cyclohexane, and removing the $H_2S$ which is liberated. The reaction is carried out at any temperature in the range of 50° to 120° C., selecting the lowest practical temperature without decomposition. If different radicals are desired for the various R radicals, a mixture of alcohols may be used in the production of the dithiophosphoric acid ester. Likewise, dithiophosphoric acid esters produced from different alcohols can be mixed for use in the reaction with the chlorothioxane. The esters of dithiophosphoric acid used in preparation of the compounds of this invention are thus made from individual alcohols or mixtures of alcohols having 1 to 4 carbon atoms. Included among such alcohols are methanol, ethanol, propanol-1, propanol-2, 2-methyl propanol-1, butanol-1 and butanol-2.

The methods by which the products of this invention are isolated will vary slightly with the reactants used and the product produced. In some instances, the chloride salt split out in the reaction separates and can be filtered off. In other instances, the chloride salt is best removed by washing with water. The excess salt of the ester of dithiophosphoric acid is also removed by the water wash. The benzene or other solvent is then removed by distillation leaving an insecticidally active residue. Further purification by selective solvent extraction or by adsorptive agents such as activated carbon, or clays, can precede the removal of the solvent. Likewise, an organic solvent can be added to aid in the purification by adsorptive agents. However, the product is generally satisfactory for use as a pesticide without further purification.

The compounds of this invention are used as the sole toxic agent in pesticidal formulations or in admixture with other toxicants for modification of the properties of the individual toxicants. They may be used, for example, in admixture with toxaphene, DDT, Thanite, chlordane, rotenone, pyrethrum, and the like in many of the formulations suggested below.

The compounds of this invention are made into pesticidal compositions for use against insects and mites by dilution with an insecticidal adjuvant as a carrier therefor, by dispersing in an organic solvent, or in water, or by diluting with a solid insecticidal adjuvant as a carrier. Dispersions containing a surface-active dispersing agent have the advantage of spreading the toxic substance more effectively over the plant surface. Dispersions in organic solvents include dispersions in alcohols, pine oil, hydrocarbon solvents, difluorodichloromethane, and similar organic solvents. The compounds of this invention are also used in aerosol formulations in which difluorodichloromethane and similar aerosol propellants form the propellant vehicle.

Aqueous dispersions are made up from the compounds of this invention, a surface-active dispersing agent and water as the essential ingredients. The amount of the compounds of this invention in the aqueous dispersions when diluted for spraying of plants will be in the range of about 10% to about 0.001% of the aqueous dispersion.

The aqueous dispersion will ordinarily be made up from a concentrate, and the concentrate will be dispersed in water to the proper concentration for application to the plants to be treated in the field. The concentrate is composed essentially of the compound of this invention and a surface-active dispersing agent. The concentrate may also contain sufficient amounts of organic solvents to aid in effective dispersion. The amount of surface-active dispersing agent used is usually at least 5% of the amount of toxic compound in the concentrate.

Suitable surface-active dispersing agents for use in the compositions of this invention are those disclosed in Chemistry of Insecticides, Fungicides, and Herbicides (Donald E. H. Frear, Second Edition (1948), pages 280–287) for use with known insecticides and include neutral soaps of resin, alginic and fatty acids and alkali metals or alkylamines or ammonia, saponins, gelatins, milk, soluble casein, flour and soluble proteins thereof, sulfite lye, lignin pitch, sulfite liquor, long-chain fatty alcohols having 12 to 18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, China clay, kaolin, attapulgite, and bentonite and related hydrated aluminum silicates having the property of forming a colloidal gel. Among the other surface-active dispersing agents which are useful in the compositions of this invention are the omega-substituted polyethylene glycols of relatively long-chain length, particularly those in which the omega substituent is aryl, alkyl, or acyl. Compositions of the toxic material and surface-active dispersing agent will, in some instances, have more than one surface-active dispersing agent for a particular type of utility, or in addition to a surface-active dispersing agent, hydrocarbons such as kerosene and mineral oil will also be added as improvers. Thus, the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents.

What I claim and desire to protect by Letters Patent is:

1. As a new composition of matter a compound of the formula

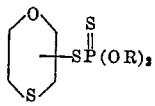

in which each R represents an alkyl radical having 1–4 carbon atoms.

2. As a new composition of matter a compound of the formula

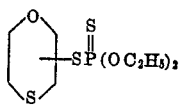

3. As a new composition of matter a compound of the formula

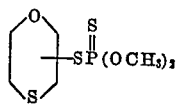

4. As a new composition of matter a compound of the formula

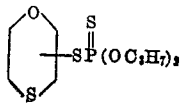

5. As a new composition of matter a compound of the formula

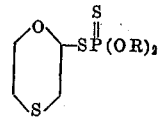

in which each R represents an alkyl radical having 1–4 carbon atoms.

6. As a new composition of matter a compound of the formula

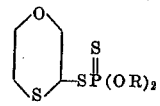

in which each R represents an alkyl radical having 1–4 carbon atoms.

7. A pesticidal composition comprising the compound of claim 1 and an insecticidal adjuvant.

8. A pesticidal composition comprising the compound of claim 2 and an insecticidal adjuvant.

9. A pesticidal composition comprising the compound of claim 3 and an insecticidal adjuvant.

10. A pesticidal composition comprising the compound of claim 4 and an insecticidal adjuvant.

11. A pesticidal composition comprising the compound of claim 5 and an insecticidal adjuvant.

12. A pesticidal composition comprising the compound of claim 6 and an insecticidal adjuvant.

13. The method of producing a compound of the formula

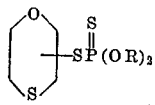

which comprises heating a compound of the formula

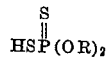

where R in each instance is a lower alkyl radical of 1–4 carbon atoms, with a compound of the formula

at a temperature in the range of about 30° C. to about 100° C.

14. The method of producing a compound of the formula

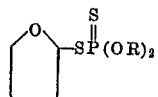

which comprises heating a compound of the formula

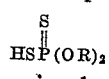

where R in each instance is a lower alkyl radical of 1–4 carbon atoms, with a compound of the formula

at a temperature in the range of about 30° C. to about 100° C.

15. The method of producing a compound of the formula

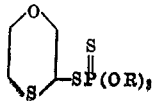

which comprises heating a compound of the formula

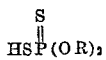

where R in each instance is a lower alkyl radical of 1–4 carbon atoms, with a compound of the formula

at a temperature in the range of about 30° C. to about 100° C.

16. As a new composition of matter a compound of the formula

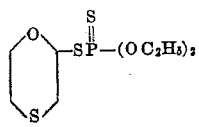

17. As a new composition of matter a compound of the formula

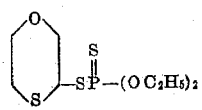

References Cited in the file of this patent
UNITED STATES PATENTS

| | | |
|---|---|---|
| 2,725,327 | Diveley | Nov. 29, 1955 |
| 2,725,331 | Haubein | Nov. 29, 1955 |